US007526084B2

(12) United States Patent
Smaragdis et al.

(10) Patent No.: US 7,526,084 B2
(45) Date of Patent: Apr. 28, 2009

(54) SECURE CLASSIFYING OF DATA WITH GAUSSIAN DISTRIBUTIONS

(75) Inventors: Paris Smaragdis, Brookline, MA (US); Madhusudara Shashanka, Allston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 769 days.

(21) Appl. No.: 11/219,452

(22) Filed: Sep. 2, 2005

(65) Prior Publication Data
US 2007/0053507 A1    Mar. 8, 2007

(51) Int. Cl.
*H04L 9/00* (2006.01)
*H04L 9/32* (2006.01)
(52) U.S. Cl. ........................................ 380/28; 713/189
(58) Field of Classification Search ................... 380/28, 380/46; 713/176, 189–190
See application file for complete search history.

(56) References Cited

U.S. PATENT DOCUMENTS 4,972,480 A * 11/1990 Rosen .......................... 380/46
6,014,445 A * 1/2000 Kohda et al. ................... 380/28

OTHER PUBLICATIONS

R. Canetti, Y. Ishai, R. Kumar, M. K. Reiter, R. Rubinfeld, and R. N. Wright. Selective private function evaluation with applications to private statistics. In Proceedings of the ACM symposium on principles of distributed computing, pp. 293-304, 2001.

Ivan Damgard and Mads Jurik. A generalisation, simplification and some applications of paillier's probabilistic public-key system. In Proceedings of the Int. Workshop on Practice and Theory in Public Key Cryptography, vol. 1992 of Lecture Notes in Computer Science, pp. 119-136, 2001.

W. Du and M. J. Atallah. Privacy-preserving cooperative statistical analysis. In Proceedings of the 17th Annual Computer Security Applications Conference, New Orleans, Louisiana, Dec. 2001.

W. Du and Z. Zhan. A practical approach to solve secure multi-party computation problems. In Proceedings of New Security Paradigms Wokrshop, Virginia Beach, virginia, USA, Sep. 23-26, 2002.

J. Feigenbaum, Y. Ishai, T. Malkin, K. Nissim, M. Strauss, and R. N. Wright. Secure multiparty computation of approximations. In Proceedings of the Intl. Colloquium on Automata, Languages and Programming, vol. 2076 of Lecture Notes in Computer Science, pp. 947-938, 2001.

(Continued)

*Primary Examiner*—Hosuk Song
(74) *Attorney, Agent, or Firm*—Dirk Brinkman; Gene Vinokur

(57) ABSTRACT

A first party has a data vector x and a second party has a classifier defined as a set of multivariate Gaussian distributions. A secure inner dot product procedure is applied to each multivariate Gaussian distribution and the data vector x to produce a vector $a_i$ for the first party and a vector $b_i$ for the second party for each application. The secure inner dot product is then applied to each vector $b_i$ and the data vector x to produce a scalar $r_i$ for the first party and a scalar $q_i$ for the second party for each application. A summed vector of elements $[(a_1x+q_1+r_1), \ldots , (a_Nx+q_N+r_N)]$ is formed, and an index I of the summed vector for a particular element having a maximum value is the class of the data vector x.

8 Claims, 3 Drawing Sheets

OTHER PUBLICATIONS

B. Goethals, S. Laur, H. Lipmaa, and T. Mielikainen. On private sclar product computation for privacy-preserving data mining. In C. Park and S. Chee, editors, Intl. Conference on Information Security and Cryptology, vol. 2506 of Lecture Notes in Computer Science, pp. 104-120, 2004.

I. Ioannidis, A. Grama, and M. Atallah. A secure protocol for computing dot-products in clustered and distributed environments. In Proceedings of the Intl. Conf. on Parallel Processing, Vancouver, Canada, 2002.

E. Kiltz, G. Leander, and J. Malone-Lee. Secure computation of the mean and related statistics. In Proceedings of the Theory of Cryptography Conference, vol. 3378 of Lecture Notes in Computer Sciences, pp. 283-302, 2005.

Pascal Paillier. Public-key cryptosystems based on composite degree residuosity classes. In J. Stern, editor, Proceedings of Advances in Cryptology—EUROCRYPT '99, vol. 1592 of Lecure Notes in Computer Science, pp. 223-238, 1999.

P. Ravikumar, W. W. Cohen, and S. E. Fienberg. A secure protocol for computing string distance metrics. In Proceedings of the Workshop on Privacy and Security Aspects of Data Mining, pp. 40-46, Brighton, UK, 2004.

J. Vaidya and C. Clifton. Privacy preserving association rule mining in vertically partitioned data. In Proceedings of the Intl. Conf. on Knowledge Discovery and Data Mining, Edmonton, Canada, 2002. ACM SIGKDD.

\* cited by examiner

SECURE CLASSIFYING OF DATA WITH GAUSSIAN DISTRIBUTIONS

FIELD OF THE INVENTION

This invention relates generally to classifying data, and more particularly to securely classifying data.

BACKGROUND OF THE INVENTION

With the availability of global communication networks, it is now common to 'outsource' data processing tasks to third parties for a number of reasons. For example, the processing can be done at a reduced cost, or the third party has better computational resources and/or better technologies. One concern with outsourcing data processing is an inappropriate use of confidential information by third parties.

A user or client, perhaps with limited data processing resources, desires to classify data. A third party or server has some of the necessary resources. It is desired to have the third party classify the data without revealing the data to the third party. At the same time, the third party wants to keep its classifier secret. For such applications, conventional cryptography protects only the data during transport, and not the processing by the third party.

In a specific example application, a client, Alice, has a data vector. A server, Bob, has a classifier that uses Gaussian distributions. Bob's classifier can be used to classify Alice's data vector. Alice and Bob would like to engage in a protocol that lets Bob classify Alice's data without revealing the data vector to Bob and the classifier to Alice.

Secure multi-party computations are often analyzed for correctness, security, and overhead. Correctness measures how close a secure process approaches an ideal solution. Security measures the amount of information that can be gained from the multi-party exchange. Overhead is a measure of complexity and efficiency.

A two-party protocol between Alice and Bob is secure when privacy and correctness are guaranteed for both Alice and Bob. The protocol protects privacy when the information that is 'leaked' by the distributed computation is limited to the information that can be learned from the designated output of the computation. In a semi-honest case, both parties follow the protocol as prescribed but may record all messages and subsequently deduce information not derivable solely from the protocol output. In the malicious case, however, no assumption is made about the behavior of the parties. It is required that the privacy of one party is preserved even in the case of an arbitrary behavior of another party. A protocol in the semi-honest case can be made secure in the malicious case when accompanied with zero-knowledge proofs that both parties follow the protocol.

Zero Knowledge Protocols

Zero-knowledge or secure multi-party protocols were first described by Yao, "How to generate and exchange secrets," Proceedings of the 27th IEEE Symposium on Foundations of Computer Science, pp. 162-167, 1986, for a specific problem. Later, that zero-knowledge technique was extended to other problems, Goldreich et al., "How to play any mental game—a completeness theorem for protocols with honest majority," 19th ACM Symposium on the Theory of Computing, pp 218-229, 1987. However, those theoretical constructs are still too demanding to be of any use for practical applications.

Since then, many secure methods have been described, Chang et al., "Oblivious Polynomial Evaluation and Oblivious Neural Learning," Advances in Cryptology, Asiacrypt '01, Lecture Notes in Computer Science Vol. 2248, pages 369-384, 2001; Clifton et al., "Tools for Privacy Preserving Distributed Data Mining," SIGKDD Explorations, 4(2):28-34, 2002; Koller et al., "Protected Interactive 3D Graphics Via Remote Rendering," SIGGRAPH 2004; Lindell et al., "Privacy preserving data mining," Advances in Cryptology—Crypto 2000, LNCS 1880, 2000; Naor et al., "Oblivious Polynomial Evaluation," Proc. of the 31st Symp. on Theory of Computer Science (STOC), pp. 245-254, May 1999; and Du et al., "Privacy-preserving cooperative scientific computations," 4th IEEE Computer Security Foundations Workshop, pp. 273-282, Jun. 11, 2001. A full treatment of the problem can be found in the reference text book by Goldreich, *Foundations of Cryptography*, Cambridge University Press, 1998, all incorporated herein by reference.

Secure Inner Dot Products

A large number of computer implemented methods and applications require that one computes an inner product. Therefore, protocols and procedures for determining a secure inner dot product (SIP) have been developed. It is understood that these protocols are known to those of ordinary skill in the art.

The protocols can be categorized broadly as cryptographic protocols and algebraic protocols. The protocols provide different levels of security and efficiency. Because computational costs, in general, are constantly decreasing, the main concern in evaluating the protocols is security and communication costs.

Generally, an inner dot product of two vectors x and y produces two scalar values a and b according to $x^t y = a + b$, where t is a transpose operator.

Cryptographic Protocols

Several methods are known for providing secure inner dot products, see Goethals et al., "On private scalar product computation for privacy-preserving data mining," C. Park and S. Chee, editors, Intl. Conference on Information Security and Cryptology, Vol. 2506 of Lecture Notes in Computer Science, pp. 104-120, 2004; Feigenbaum et al., "Secure multiparty computation of approximations," Proceedings of the Intl. Colloquium on Automata, Languages and Programming, Vol. 2076 of Lecture Notes in Computer Science, pp. 927-938, 2001; and Canetti et al., "Selective private function evaluation with applications to private statistics," Proceedings of the ACM symposium on principles of distributed computing, pp. 293-304, 2001, all incorporated herein by reference.

The Goethal et al. protocol has as input private vectors x and y belonging to Bob and Alice respectively, and as output, the scalar values a and b such that $a + b = x^t y$. During an initialization phase, Bob generates a private and public key pair (sk, pk). Bob sends pk to Alice. Then, for each $i \in \{1, \ldots, d\}$, Bob generates a new random string $r_i$, and sends $c_i = \text{En}(pk; x_i, r_i)$ to Alice. In response, Alice sets $$z \leftarrow \prod_{i=1}^{d} c_i^{y_i},$$

generates a random plaintext b and a random nonce r', and sends $z' = z \cdot \text{En}(pk; -b, r')$ to Bob. Then, Bob determines $a = \text{De}(sk; z') = x^t y - b$. Goethals et al. describe a proof that the protocol is correct and secure. It can also be shown that the communication overhead is $k'/\tau$, where k' is the bit size of each encrypted message sent by Alice, and $\tau = \lfloor \sqrt{m/d} \rfloor$ for a large m. In a homomorphic cryptosystem, typical values would be $k' \approx 2048$ and $m \approx 2^{1024}$, see Paillier, "Public-key cryptosystems based on composite degree residuosity classes," J. Stern, editor, Proceedings of Advances in Cryptology—EUROCRYPT '99, Vol. 1592 of Lecture Notes in Computer Science, pp. 223-238, 1999; and Damgard et al., "A generalization, simplification and some applications of Paillier's probabilistic public-key system," Proceedings of the Intl. Workshop on Practice and Theory in Public Key Cryptography, Vol. 1992 of Lecture Notes in Computer Science, pp. 119-136, 2001, all incorporated herein by reference.

Another protocol uses the technique of oblivious polynomial evaluation (OPE), see Naor et al., "Oblivious transfer and polynomial evaluation," Proceedings of the thirty-first annual ACM symposium on Theory of computing, pp. 245-254, 1999, incorporated herein by reference. The protocol uses an additive oracle which computes every term $x_i y_j$ of the dot product $x^t y$ and expresses the $j^{th}$ term as $S_{A_j} + S_{B_j}$. Alice and Bob receive $S_{A_j}$ and $S_{B_j}$, respectively for all j. The result $x^t y$ is given by $$\sum_{i=1}^{d} S_{A_i} + \sum_{i=1}^{d} S_{B_i}.$$

Alice and Bob can implement the additive oracle using the OPE.

Canetti et al. describe a protocol which uses homomorphic encryption for determining a weighted sum of a set of numbers from a database. Feigenbaum et al. describe a protocol to determine the $L^2$ distance between two vectors, see Feigenbaum et al., "Secure multiparty computation of approximations," Proceedings of the Intl. Colloquium on Automata, Languages and Programming, Vol.2076 of Lecture Notes in Computer Science, pages 927-938, 2001, all incorporated herein by reference. Both of those protocols can be used to determine dot-products securely.

Algebraic Protocols

Algebraic protocols can also be used for determining secure dot products. However, most of these protocols leak some information, see Du et al., "Privacy-preserving cooperative statistical analysis," Proceedings of the 17th Annual Computer Security Applications Conference, December 2001; Du et al., "A practical approach to solve secure multiparty computation problems," Proceedings of New Security Paradigms Workshop, Sep. 23-26 2002; Ioannidis et al., "A secure protocol for computing dot-products in clustered and distributed environments," Proceedings of the Intl. Conf. on Parallel Processing, 2002; Ravikumar et al., "A secure protocol for computing string distance metrics," Proceedings of the Workshop on Privacy and Security Aspects of Data Mining, pages 40-46, Brighton, UK, 2004; and Vaidya et al., "Privacy preserving association rule mining in vertically partitioned data," Proceedings of the Intl. Conf. on Knowledge Discovery and Data Mining. The properties and weaknesses of some of these protocols have been analyzed, see Kiltz et al., "Secure computation of the mean and related statistics," Proceedings of the Theory of Cryptography Conference, Vol.3378 of Lecture Notes in Computer Science, pages 283-302, 2005; and Goethals et al., "On private scalar product computation for privacy-preserving data mining," C. Park and S. Chee, editors, Intl, Conference on Information Security and Cryptology, Vol.2506 of Lecture Notes in Computer Science, pp. 104-120, 2004, all incorporated herein by reference.

The basic idea in the protocols of Du et al. is to express the vector x as a sum of M random vectors, i.e., $$\sum_{m=1}^{M} u_m.$$

For every m, Alice sends $u_m$ concealed in a set of k random vectors. Bob computes the dot product with y for all the vectors, and adds a random number $r_m$ to all products. The results are sent to Alice. Alice and Bob repeat this M times. Finally, Alice and Bob have $$\sum_{m=1}^{M} (u_m^t y + r_m) \quad \text{and} \quad -\sum_{m=1}^{M} r_m,$$

respectively, which when added gives the required result.

Du et al. use random permutations. Let $\pi(x)$ be a vector whose elements are a random permutation of elements of x. The product $\pi(x)^t \pi(y)$ is equal to $x^t y$. Bob expresses y as the sum of M random vectors, i.e., $$y = \sum_{m=1}^{M} v_m.$$

Bob generates m random vectors $r_i$ and m random permutations $\pi_m$. For each m, Alice learns $\pi_m(x+r_m)$ without learning $\pi_m$ or $r_m$. Using a homomorphic encryption scheme as in Du et al., Bob sends $\pi_m(v_m)$ to Alice, and Alice computes $\pi_m(x+r_m)^t \pi_m(v_m)$. Finally, Alice has $$\sum_{m=1}^{M} (x^t v_m + r_m^t v_m),$$

and Bob has $$-\sum_{m=1}^{M} (r_m^t v_m)$$

which together form the result. Alice's chances of successfully guessing all elements in y is $$\left(\frac{1}{d!}\right)^M.$$

Another protocol assumes that the number of elements d in the data vector x is even. A vector $x_1$ is defined as a d/2 dimension vector including the first d/2 elements of the vector x, and the vector $x_2$ includes the last d/2 elements of x, and $x^t y = x_1^t y_1 + x_2^t y_2$. Alice and Bob jointly generate a random invertible d×d matrix M. Alice computes $x'=x^t M$, which is partitioned into $x'_1$ and $x'_2$, and sends $x'_2$ to Bob. Bob computes $y'=M^{-1}y$, splits it as $y'_1$ and $y'_2$ and sends $y'_1$ to Alice. Alice computes $x'_1 y'_1$ and Bob computes $x'_2 y'_2$ so that their sum is the required result.

Other algebraic protocols for computing dot products are also known, see Ioannidis et al., "A secure protocol for computing dot-products in clustered and distributed environments," Proceedings of the Intl. Conf. on Parallel Processing, 2002; Vaidya et al., "Privacy preserving association rule mining in vertically partitioned data," Proceedings of the Intl. Conf. on Knowledge Discovery and Data Mining, 2002; and Ravikumar et al., "A secure protocol for computing string distance metrics," Proceedings of the Workshop on Privacy and Security Aspects of Data Mining, pp. 40-46, 2004, all incorporated herein by reference.

Classifiers

Data classification is well known. If the data have a multivariate distribution, then the classifier typically uses multivariate Gaussian distributions. Each class can be modeled by either a single multivariate Gaussian distribution or a mixture of multivariate Gaussian distributions.

The classifier determines a value of a discriminant function $$g_i(x) = \ln p(x|\omega_i) + \ln P(\omega_i)$$

for all classes $\omega_i$ and assign the data x to class $\omega_i$ if $g_i(x) > g_j(x)$ for all $j \neq i$. Here, $p(x|\omega_i)$ is a class-conditional probability density function, and $P(\omega_i)$ is an a priori probability of class $\omega_i$.

Single Multivariate Gaussian Distribution

The mean vector and covariance matrix of the $i^{th}$ class are $\mu_i$ and $\Sigma_i$, respectively. Hence, $p(x|\omega_i) \sim N(\mu_i, \Sigma_i)$, and the above equation can be expressed as:

$$g_i(x) = -\frac{1}{2}(x-\mu_i)^t \sum_i^{-1} (x-\mu_i) - \frac{d}{2}\ln 2\pi - \frac{1}{2}\ln\left|\sum_i\right| + \ln P(\omega_i). \quad (1)$$

If the term $(d/2) \ln 2\pi$ term is ignored, then equation (1) can be rewritten as:

$$g_i(x) = x^t \overline{W}_i x + \overline{w}_i^t x + w_{i0}, \quad (2)$$

where $\overline{W}_i = -\frac{1}{2}\sum_i^{-1}, \quad \overline{w}_i = \sum_i^{-1} \mu_i,$ and $w_{i0} = -\frac{1}{2}\mu_i^t \sum_i^{-1} \mu_i - \frac{1}{2}\ln\left|\sum_i\right| + \ln P(\omega_i).$ Vectors of (d+1)-dimensions, $\overline{x}$ and $w_i$, can be generated by appending the value 1 to the vector x, and appending an element $w_{i0}$ to the vector $\overline{w}_i$. By changing the matrix $\overline{W}_i$ into a (d+1)×(d+1) matrix $W_i$, where the first d components of the last row are zeros and the last column is equal to $w_i^t$, equation (2) can be written as:

$$g_i(x) = \overline{x}^t W_i \overline{x}.$$

Expressing $\overline{x}$ as x, the equation becomes:

$$g_i(x) = x^t W_i x. \quad (3)$$

Mixture of Distributions Gaussians

The mean vector and covariance matrix of the $j^{th}$ Gaussian distribution in class $\omega_i$ are $\Sigma_{ij}$ and $\Sigma_{ij}$, respectively. Hence, $$p(x|\omega_i) = \sum_{j=1}^{J_i} \alpha_{ij} N\left(\mu_{ij}, \sum_{ij}\right),$$

where $J_i$ is the number of Gaussian distributions describing class $\omega_i$, and $\alpha_{ij}$ are the coefficients of the mixture of Gaussian distributions.

A log likelihood for the $j^{th}$ Gaussian distribution in the $i_{th}$ class is given by $$l_{ij}(x) = x^t \overline{W}_{ij} x + \overline{w}_{ij}^t x + w_{ij}, \quad (4)$$

where $\overline{W}_{ij} = -\frac{1}{2}\sum_{ij}^{-1}, \quad \overline{w}_{ij} = \sum_{ij}^{-1} \mu_{ij},$ and $w_{ij} = -\frac{1}{2}\mu_{ij}^t - \frac{1}{2}\ln\left|\sum_{ij}\right|.$ Expressing x as a (d+1)-dimensional vector and $\overline{W}_{ij}$, $\overline{w}_{ij}$, $w_{ij}$ together as the (d+1)×(d+1) matrix $W_{ij}$, as described above, equation (4) becomes:

$$l_{ij}(x) = x^t W_{ij} x. \quad (5)$$

Hence, the discriminant function for the $i^{th}$ class can be written as $$g_i(x) = \log \text{sum}(\ln \alpha_{i1} + l_{i1}(x), \ldots, \ln \alpha_{iJ_i} + l_{iJ_i}(x)) + \ln P(\omega_i). \quad (6)$$

where $$\log \text{sum}(x_1, \ldots, x_{J_i}) = \max(x_1, \ldots, x_{J_i}) + \ln\left(\sum_{j=1}^{J_i} e^{\Delta_j}\right),$$

and $$\Delta_j = x_j - \max(x_1, \ldots, x_{J_i}) \; \forall j \in \{1, \ldots, J_i\}.$$

Hereinafter, the data vector x denotes a (d+1)-dimensional vector with a last component equal to 1, unless stated otherwise.

SUMMARY OF THE INVENTION

The invention provides a method for securely classifying data. A first party has a data vector x to be classified. A second party has a classifier defined as a set of multivariate Gaussian distributions. There is one multivariate Gaussian distribution for each possible class.

A secure inner dot product procedure is applied to each multivariate Gaussian distribution and the data vector x to produce a vector $a_i$ for the first party and a vector $b_i$ for the second party for each application. The secure inner dot product is then applied to each vector $b_i$ and the data vector x to produce a scalar $r_i$ for the first party and a scalar $q_i$ for the second party for each application.

A summed vector of elements $[(a_1x+q_1+r_1) \ldots (a_Nx+q_N+r_N)]$ is formed, and an index I of the summed vector for a particular element having a maximum value is the class of the data vector x.

DETAILED DESCRIPTION OF THE PREFERRED EMBODIMENTS

Figure 1:
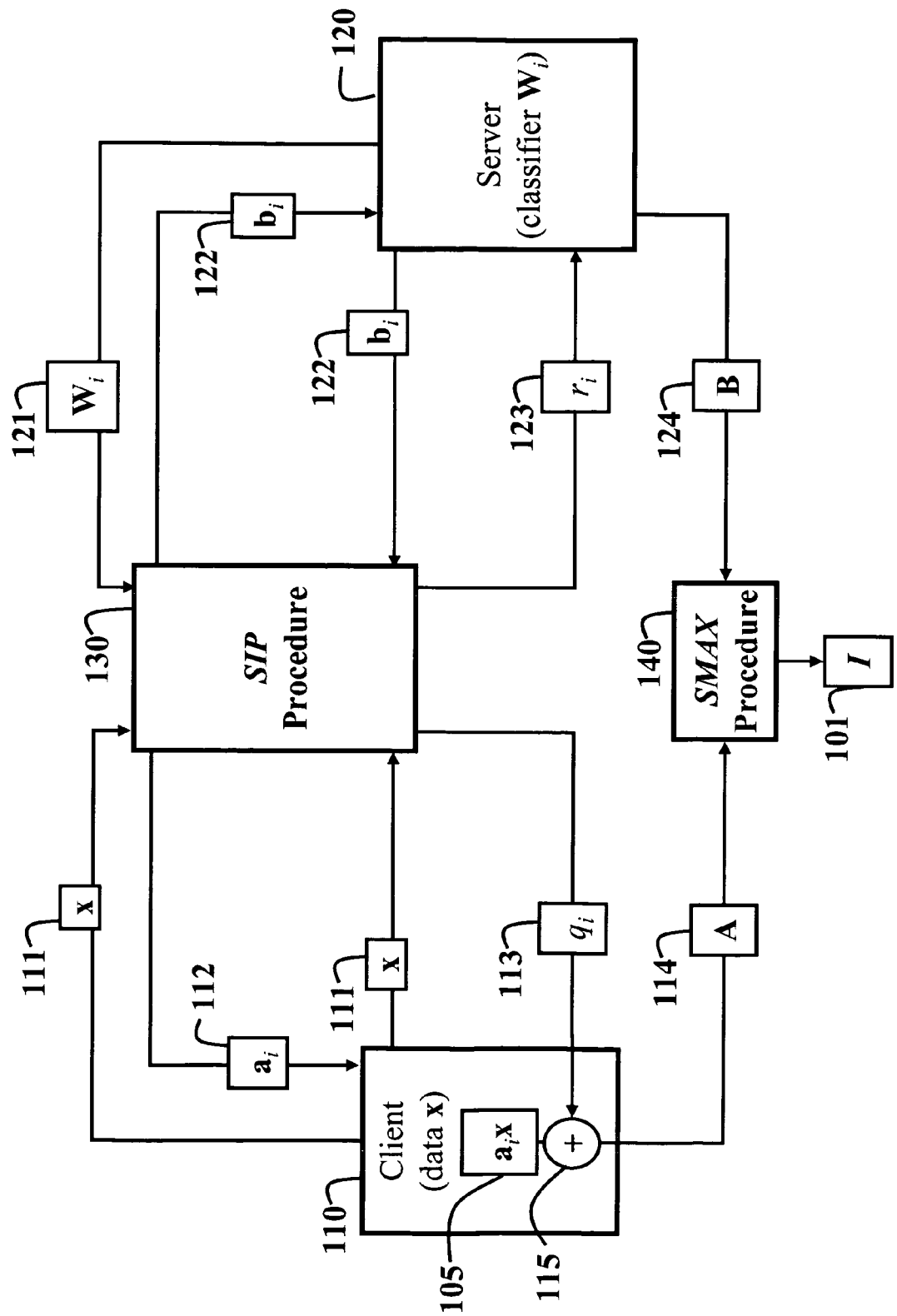
FIG. 1 is a block diagram of a secure method for classifying data with multivariate Gaussian distributions according to an embodiment of the invention.

FIG. 1 shows a secure method 100 for classifying data according to one embodiment of our invention. Alice, a client 110, has data in the form of a vector x 111. Bob, a server 120, has a classifier, $W_i$ 121, that uses multivariate Gaussian distributions. In this embodiment of our invention shown in FIG. 1, there is one multivariate Gaussian distribution for each data class. In another embodiment shown in FIG. 2, the classifier is in terms of a mixture of multivariate Gaussian distributions for each class.

Single Multivariate Gaussian Distribution

The classifier 121 can be in the form of a matrix $W_i$ for i=1, 2, ..., N. We express the matrix $W_i$ as $\lfloor w_i^1 w_i^2 \ldots w_i^{d+1} \rfloor$, where $w_i^j$ is the $j^{th}$ column of the matrix $W_i$.

One embodiment of the invention uses a secure inner dot product (SIP) procedure 130. It should be noted that the steps of the SIP are partially performed by Alice 110 and partially by Bob 120, as described above. The SIP takes as input the vector x 111 and the Gaussian distributions $W_i$ 121. A pair of scalar values $a_j$ and $b_j$ is produced for each application of the SIP procedure 130 to every column $w_i^j$ of the classifier $W_i$ 121. For every i, Alice obtains all the scalar values $a_j$ as a vector $a_i=[a_1 \ldots a_{d+1}]$ 112 and determines $a_ix$ 105, and Bob obtains all the scalar values $b_j$ as a vector $b_i=[b_1 \ldots b_{d+1}]$ 122.

Then, the SIP 130 is applied again for the data vector x 111 and the vector $b_i$ 122. This produces the scalar values $q_i$ 113 and $r_i$ 123, respectively.

Alice construct a vector $A=[(a_1x+q_1) \ldots (a_Nx+q_N)]$ 114 using a summation 115, and Bob constructs a vector $B=[r_1 \ldots r_N]$ 124.

Then, Alice and Bob perform a secure maximum protocol (SMAX) 140 on the vectors A and B, and Alice obtains SMAX(A, B), which is the classification I 101 of the data vector x 111.

Correctness: Vectors $a_i$ and $b_i$ are such that $a_i+b_i=x^tW_i$. Also, $b_ix=q_i+r_i$. Hence, $x^tW_ix$ is given by $a_ix+q_i+r_i$. The value I is equal to the value of index i for which $x^tW_ix$ is maximum.

Efficiency: For a given i=I, the above protocol has (d+2) SIP calls. Hence, the protocol requires N(d+2) calls to SIP procedure 130 and one call to SMAX.

Security: Neither Alice nor Bob learn the complete result of any dot product. Hence, if the protocols for SIP and SMAX are secure, then the entire protocol is secure.

Mixture of Multivariate Gaussian Distributions

Figure 2:
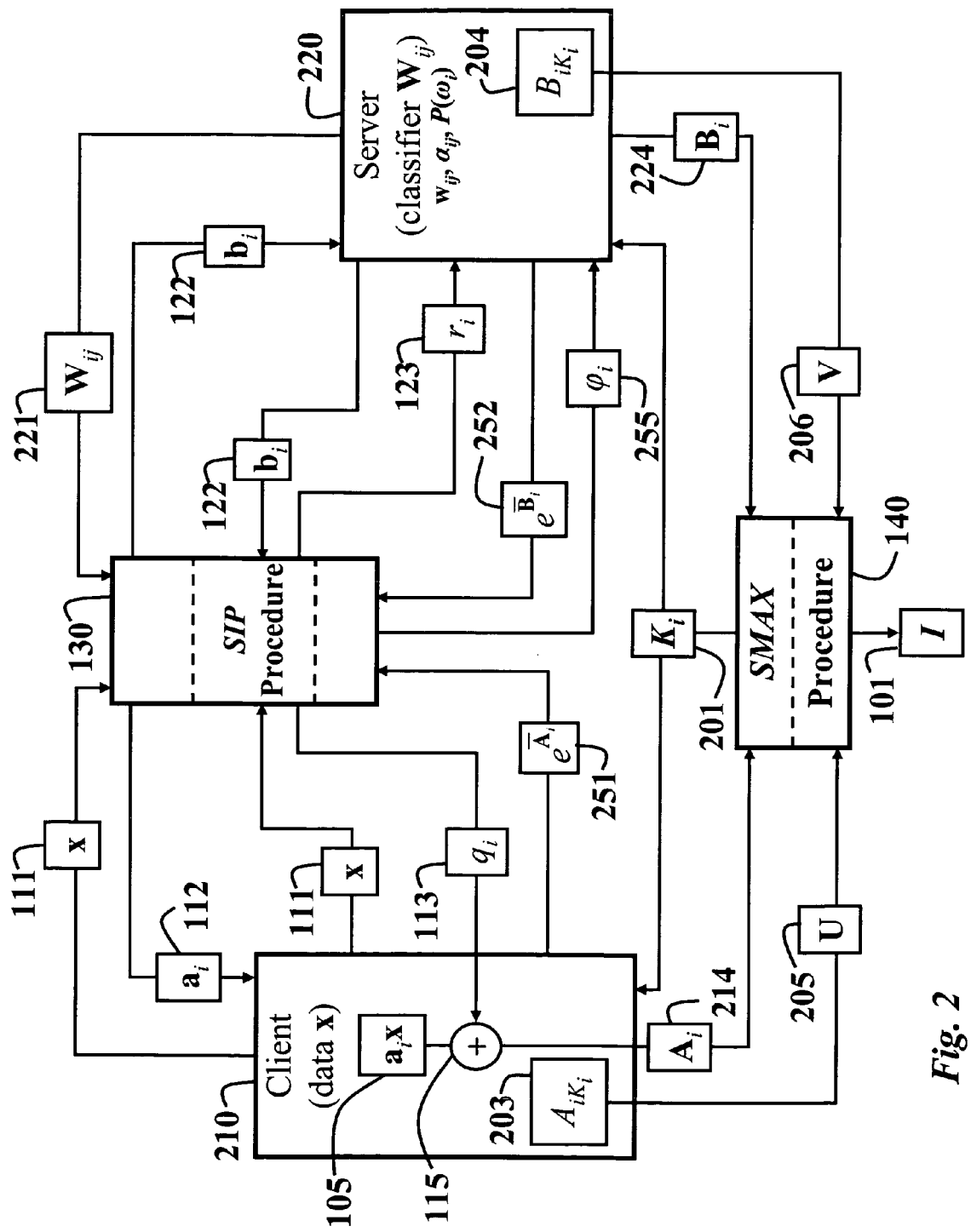
FIG. 2 is a block diagram of a secure method for classifying data with mixtures of multivariate Gaussian distributions according to an embodiment of the invention.

FIG. 2 shows a method 200 for classifying data with mixtures of Gaussian distributions. In this method, there are three calls to the SIP procedure 130, and two calls to the SMAX procedure 140.

As before, Alice 210 has the data vector x 111. Bob 220 now has a classifier 221. In the embodiment shown in FIG. 2, the classifier 221 includes, for each class, a mixture of Gaussian distributions $w_{ij}$, mixture weights $a_{ij}$ and prior probabilities $P(\omega_i)$, for i=1, 2, ..., N and j=1, 2, ..., $j_i$. As output, Alice obtains the class I 101 such that $g_1(x) > g_j(x)$ for all j≠I.

The method 200 performs the following steps: The SIP procedure 130 is applied to the vector 111 and to each Gaussian distribution 221 $W_{ij}$ in the $i^{th}$ mixture to obtain intermediate classification indices $K_i$ 201, then the SMAX procedure is applied to each pair $A_i$ 214 and $B_i$ 224, which is derived as described above.

It should be noted that the vector 214 is $A_i=[A_{i1} \ldots A_{iJ_i}]$ and the vector 224 is $B_i=[B_{i1} \ldots B_{iJ_i}]$.

In intermediate steps by Bob, a vector $B'_i=[B'_{i1} \ldots B'_{iJ_i}]$ is constructed from scalar value $r_i$ 123, and $B_{ij}=B'_{ij}+\ln a_{ij}$ so that $A_{ij}+B'_{ij}=l_{ij}(x)$, where l is the log likelihood as used in equations (5) and (6) above.

Alice and Bob use the indices $K_i$ 201 to select elements $A_{iK_i}$ 203 and $B_{iK_i}$ 204 respectively, from matrices $A_i$ 214 and $B_i$ 224. Alice constructs a vector U 205 from all elements $A_{iK_i}$.

Alice and Bob determine intermediate vectors $$\overline{A}_i=[(A_{i1}-A_{iK_i}) \ldots (A_{iJ_i}-A_{iK_i})], \text{ and}$$

$$\overline{B}_i=[(B_{i1}-B_{iK_i}) \ldots (B_{iJ_i}-B_{iK_i})],$$

respectively, and use these vectors as exponents to form vectors $e^{\overline{A}_i}$ 251 and $e^{\overline{B}_i}$ 252.

The SIP procedure 130 is applied to the vectors $e^{\overline{A}_i}$ 251 and $e^{\overline{B}_i}$ 252. The result is $\phi_i$ 255.

Bob constructs a vector 206, $V=[v_1 \ldots v_N]$, where $v_i=B_{iK_i}+\ln \phi_i+\ln P(\omega_i)$. Alice constructs the vector 205, $U=[u_1 \ldots u_N]$, where $u_i=A_{iK_i}$, as described above. The SMAX procedure 140 is applied to the vectors U 205 and V 206, and Alice obtains the class I 101.

Correctness: According to the above protocol, $u_i+v_i$ is=$g_i(x)$, see equation (7).

Efficiency: For a given i, there are $(J_i(d+2)+1)$ calls to the SIP procedure 130, and two calls to the SMAX procedure 140.

Security: Alice and Bob do obtain the index of the maximum value in the vector $A_i+B_i$. It might appear that this leaks some information to Bob about the vector x. Indeed, if Bob knew the index of the maximum of the vector $A_i+B'_i$, then Bob would know in which Gaussian of the mixture x lies. Bob could use this information from every class to learn about the distribution of the data vector x. However, Bob learns the index only after adding $\ln \alpha_{ij}$ to every element. Consequently, the index that Bob learns could be different from the index of the maximum of $A_i+B'_i$. To eliminate the possibility of Bob learning the index, the following alternative protocol is provided.

Mixture of Multivariate Gaussian Distributions with Secure Maximum Value

Figure 3:
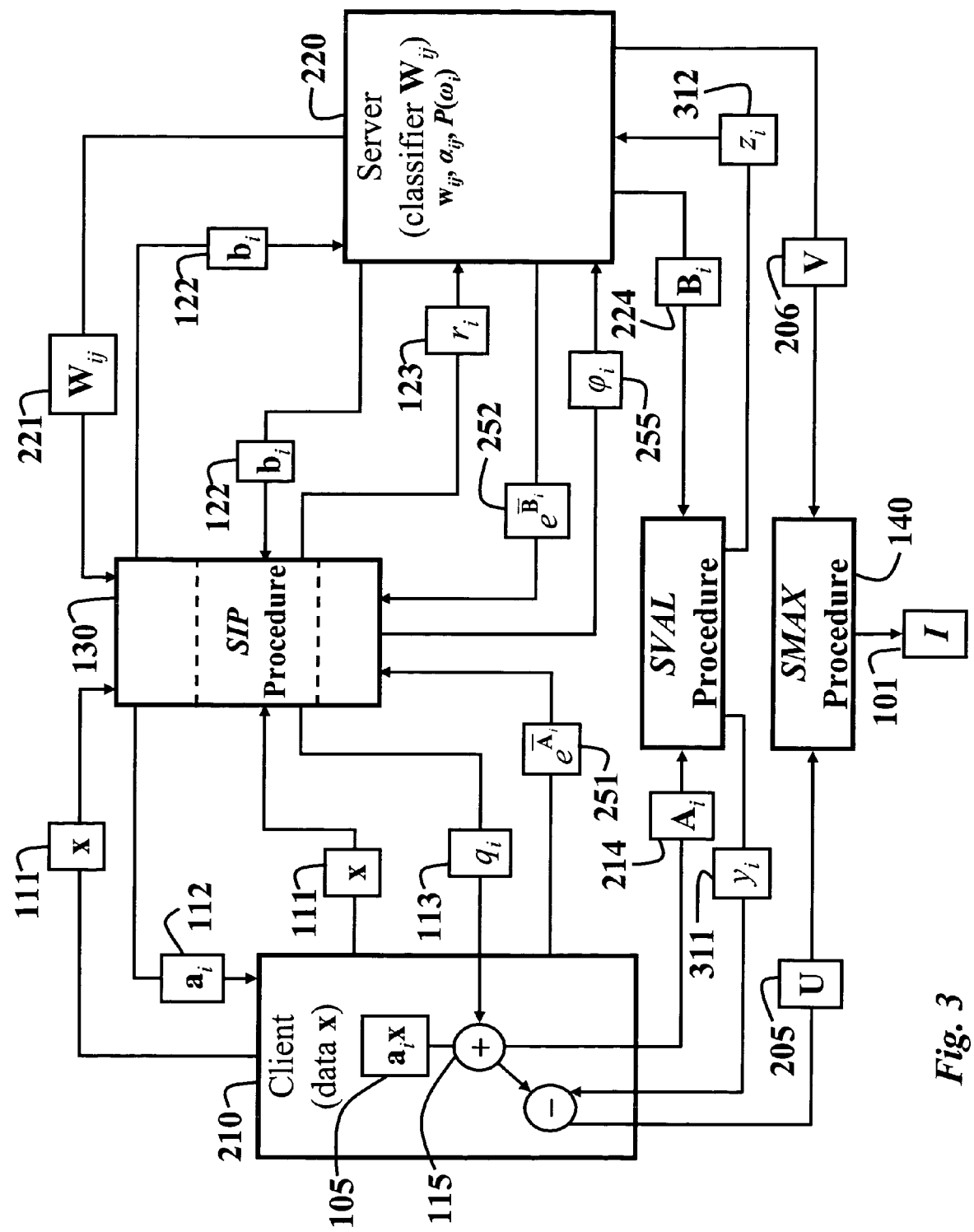
FIG. 3 is a block diagram of a secure method for classifying data with mixtures of multivariate Gaussian distributions according to an embodiment of the invention.

FIG. 3 shows a method 300 for classifying the data vector with the mixtures of Gaussian distributions. In this method, there are three calls to the SIP procedure 130, one call to the SMAX procedure 140, and one call to a SVAL procedure 310, described below.

This protocol eliminates the possibility of Bob learning the index of the maximum value as determined above. This protocol is similar to the protocol of FIG. 2.

In this protocol, Alice and Bob use intermediate values $y_i$ 311 and $z_i$ 312, instead of $A_{iK_i}$ 203 and $B_{iK_i}$ 204 directly. Thus, the protocol 300 can be expressed as follows:

Input: As before, Alice has the data vector x 111, and Bob has the classifier $W_{ij}$ 221, mixture weights $\alpha_{ij}$, and prior probabilities $P(\omega_i)$, for $i=1, 2, \ldots, N$ and $j=1, 2, \ldots, J_i$.

Output: Alice learns I 101, such that $g_1(x) > g_j(x)$, for all $j \approx I$. Bob learns nothing about the data vector x.

1. For $i=1, 2, \ldots, N$
   (a) Alice and Bob perform the steps as described above for $J_i$ Gaussians in the $i^{th}$ mixture to obtain the vectors $A_i = [A_{i1} \ldots A_{iJ_i}]$ and $B'_i = [B'_{i1} \ldots B'_{iJ_i}]$. Notice that $A_{ij} + B'_{ij} = l_{ij}(x)$.
   (b) Bob constructs the vector $B_i = [B_{i1}, \ldots, B_{iJ_i}]$, where $B_{ij} = B'_{ij} + \ln a_{ij}$.
   (c) Alice and Bob engage in the secure maximum value SVAL protocol 310 with vectors $A_i$ 214 and $B_i$ 224 to obtain the intermediate $y_i$ 311 and $z_i$ 312, i.e., $y_i + z_i = \text{SVAL}(A_i, B_i)$.
   (d) Alice and Bob determine respectively, $\overline{A}_i = [(A_{i1} - y_i), \ldots, (A_{iJ_i} - y_i)]$ and $\overline{B}_i = [(B_{i1} - z_i), \ldots, (B_{iJ_i} - z_i)]$.
   (e) Alice and Bob determine the dot product between the vectors $e^{\overline{A}_i}$ and $e^{\overline{B}_i}$ using SIP 130, and Bob obtains the result $\phi_i$ 255 of the dot product.
2. Bob determines the vector $V = [v_1, \ldots, v_N]$, where $v_i = z_i + \ln \phi_i + \ln P(\omega_i)$. Alice determines the vector $U = [u_1, \ldots, u_N]$, where $u_i = y_i$.
3. Alice and Bob perform the secure maximum index protocol 140 between vectors U 205 and V 206, and Alice obtains the class I 101.

Correctness: According to the above protocol, $u_i + v_i = g_i(x)$, see equation (7).

Efficiency: For a given i, there are $(J_i(d+2)+1)$ SIP calls, and one SVAL call and one SMAX call.

Security: If SIP, SVAL and SMAX are secure, then the above protocol is secure.

Secure Maximum Index (SMAX)

Generally, the SMAX procedure 140 determines an index to an element in a d-element vector $$[(x_1+y_1), \ldots, (x_d+y_d)] = x+y,$$

where the vector $x = [x_1, \ldots, x_d]$, and the vector $y = [y_1, \ldots, y_d]$. For example, if the fifth element is the element with the largest value, i.e., $(x_5 + y_5)$, then the index 5 is produced. A similar procedure can be used to determine a minimum index.

Our procedure is a novel extension of a procedure described by Du et al., "Privacy-preserving cooperative stanalysis," Proceedings of the 17th Annual Computer Security, December 2001.

Bob generates a random polynomial in two variables $f(x, y) = f(x+y)$, such that $f(z_1) \leq f(z_j)$ if and only if $z_i \leq z_j$. For each $i=1, 2, \ldots, d$, Alice uses oblivious polynomial evaluation (OPE) to determine $h_i(x_i)$, where $h_i(x) = f(x, y_i)$. The index for which $h_i(x_i)$ is the maximum is the answer that Alice desires. Notice that neither party can determine the value of the maximum element, but Alice can determine the order of elements in the vector $x+y$.

Secure Maximum Value Protocol (SVAL)

Alice has a vector $x = [x_1, \ldots, x_d]$, and Bob has the vector $y = [y_1, \ldots, y_d]$. Alice and Bob would like to determine the value of the maximum element in $z = x+y$. After the protocol, neither should party know the index of the maximum element. Notice that the same protocol can be used to compute the value of the minimum value.

First, consider a naive approach. Notice that $z_i \geq z_j \Leftrightarrow (x_i - x_j) \geq (y_j - y_i)$. Alice and Bob can do such pairwise comparisons and mimic any conventional maximum finding process to learn the value of the maximum. To perform the comparisons securely, Alice and Bob can use Yao's millionaire protocol, see Yao, "Protocols for secure computation," Proc. of the 23rd IEEE Symposium on Foundations of Computer Science, pp. 160-164, 1982.

However, if Alice and Bob follow that naive approach, then both will be able to also find the index of the maximum. In an improvement, Alice and Bob obtain two vectors whose sum is a random permutation of z. Neither Alice nor Bob know the permutation. Then, Alice and Bob can follow the above naive approach on their newly obtained vectors to determine additive shares of the maximum element.

Permute Protocol

Input: Alice and Bob have d-component vectors x and y, respectively. Bob has a random permutation $\pi$.

Output: Alice and Bob obtain q and s such that $q+s = \pi(x) + \pi(y)$.

1. Alice generates public and private keys for homomorphic encryption and sends the public key to Bob. Let $E(\cdot)$ denote encryption with Alice's public key.
2. Alice encrypts each element of the vector x and sends the resulting vector $\overline{x}$ to Bob.
3. Bob generates a random vector r and computes a new vector $\theta$, where $\theta_i = \overline{x}_i E(r_i) = E(x_i + r_i)$, for $i=1, \ldots, d$.
4. Bob permutes $\theta$ and sends $\pi(\theta)$ to Alice. Alice decrypts the vector to obtain q.
5. Bob computes $y - r$, and then permutes it using r to obtain $s \; \pi(y - r)$.

Alice and Bob engage in the above permute protocol twice, the second time with their roles interchanged. After this is done, Alice and Bob will have two vectors whose sum will be a random permutation of the original sum but neither of them will know what the permutation is. They can then follow the naive maximum finding approach to compute additive shares of the maximum element.

Although the invention has been described by the way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A computer implemented method for classifying data, comprising, a client and a server for performing steps of the method, comprising the steps of:

generating, by a first party using the client, a data vector x to be classified;

defining, by a second party using the server, a classifier with a set of multivariate Gaussian distributions, there being one multivariate Gaussian distribution for each possible class;

applying, to each multivariate Gaussian distribution and the data vector x, inner dot product procedures to produce a vector $a_i$ for the first party and a vector $b_i$ for the second party for each application;

applying, to each vector $b_i$ and the data vector x, the inner dot product procedure to produce a scalar $r_i$ for the first party and a scalar $q_i$ for the second party;

forming a summed vector of elements $[(a_1 x + q_1 + r_1), \ldots, (a_N x + q_N + r_N)]$; and determining an index of the summed vector for a particular element having a maximum value, the index being a class of the data vector x, wherein the applying, forming, and determining steps are performed in part by the client and in part by the server using secure multi-party protocols.

2. The method of claim 1, in which the inner dot product procedure is a secure cryptographic protocol.

3. The method of claim 1, in which the inner dot product procedure is a secure algebraic protocol.

4. The method of claim 1, in which the classifier is a matrix $W_i$ for $i=1, 2, \ldots, N$, for N classes, and the matrix $W_i$ that describes the parameters of the Gaussian distribution for class i is $\lfloor w_i^1 w_i^2 \ldots w_i^{d+1} \rfloor$, where $w_i^j$ is the $j^{th}$ column of the matrix $W_i$.

5. The method of claim 1, in which the index is determined securely.

6. The method of claim 1, in which there is a mixture of multivariate Gaussian distributions for each possible class i, and in which each multivariate Gaussian distribution $W_{ij}$ is associated with mixture weights $\alpha_{ij}$ and prior probabilities $P(\omega_i)$, for $i=1, 2, \ldots, N$ and $j=1, 2, \ldots, J_i$, where $J_i$ is the number of Gaussian distributions in the $i^{th}$ mixture.

7. A computer implemented method for classifying a vector x generated by a first party with a classifier provided by a second party, in which the classifier is defined as a set of multivariate Gaussian distributions, there being one multivariate Gaussian distribution for each of N classes, and in which the classifier is expressed as a matrix $W_i$ for $i=1, 2, \ldots, N$, and the matrix $W_i$ is expressed as $\lfloor w_i^1 w_i^2 \ldots w_i^{d+1} \rfloor$, where $w_i^j$ is a $j^{th}$ column of the matrix $W_i$, comprising a client and a server for performing steps of the method, comprising the steps of:
  (1) performing a secure inner product procedure SIP (x, $W_i^j$) to obtain vectors $a_i = \lfloor a_i^1 \ldots a_i^{d+1} \rfloor$ and vectors $a_i x$ for the first party and a vector $b_i = \lfloor b_i^1 \ldots b_i^{d+1} \rfloor$ for the second party, for $i=1, 2, \ldots, N$ and then for $j=1, \ldots, d+1$, and performing the secure inner product procedure SIP ($b_i$, x) to obtain a scalar $q_i$ for the first party and a scalar $r_i$ for the second party;
  (2) constructing a vector $A = [(a_1 x + q_1) \ldots (a_N x + q_N)]$ by the first party and a vector $B = [r_1 \ldots r_N]$ by the second party; and
  (3) performing a secure maximum index protocol SMAX (A, B) to obtain a class I associated with the data vector x by the first party.

8. The method of claim 7, in which the classifier is defined as a matrix $W_{ij}$, mixture weighs $\alpha_{ij}$ and prior probabilities $P(\omega_i)$, for $i=1, 2, \ldots, N$ and $j=1, 2, \ldots, J_i$, and further comprising the steps of:
  (1) for $i=1, 2, \ldots, N$
    (a) performing the steps (1) and (2) of claim 7 for the $J_i$ multivariate Gaussians distributions to obtain vectors $A_i = [A_{i1} \ldots A_{iJ_i}]$ for the first party and vectors $B'_i = [B'_{i1} \ldots B'_{iJ_i}]$ for the second party such that $A_{ij} + B'_{ij} = l_{ij}(x)$;
    (b) constructing a vector $B_i = [B_{i1} \ldots B_{iJ_i}]$ by the second party, where $B_{ij} = B'_{ij} + \ln \alpha_{ij}$.
    (c) performing a secure maximum index protocol SMAX ($A_i$, $B_i$) to obtain indices $K_i$ by the first party and the second party;
    (d) constructing vectors $\overline{A}_i = [(A_{i1} - A_{iK_i}) \ldots (A_{iJ_i} - A_{iK_i})]$ by the first party and vectors $\overline{B}_i = [(B_{i1} - B_{iK_i}) \ldots (B_{iJ_i} - B_{iK_i})]$ by the second party; and
    (e) performing the secure inner product SIP ($e^{\overline{A}_i}$, $e^{\overline{B}_i}$) to obtain $\phi_i$ for the second party;
  (2) constructing the vector $u = [u_1 \ldots u_N]$ by the second party, where $u_i = B_{iK_i} + \ln \phi_i + \ln P(\omega_i)$, and constructing the vector $v = [v_1 \ldots v_N]$ by the first party, where $v_i = A_{iK_i}$; and
  (3) performing the secure maximum index protocol SMAX (u, v) to obtain the class I associated with the data vector x by the first party, wherein the applying, forming, and determining steps are performed in part by the client and in part by the server using secure multi-party protocols.

* * * * *